METHOD AND APPARATUS FOR PRODUCING PARTICLE BOARD AND THE LIKE
Filed Nov. 24, 1961
3 Sheets-Sheet 1
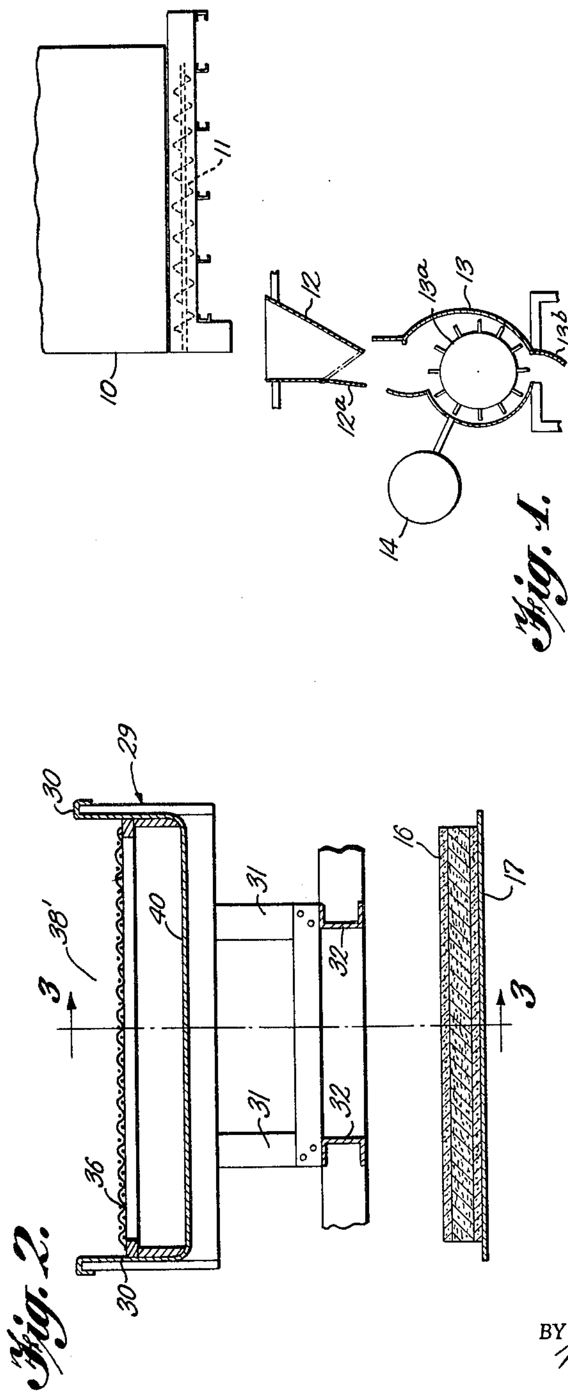
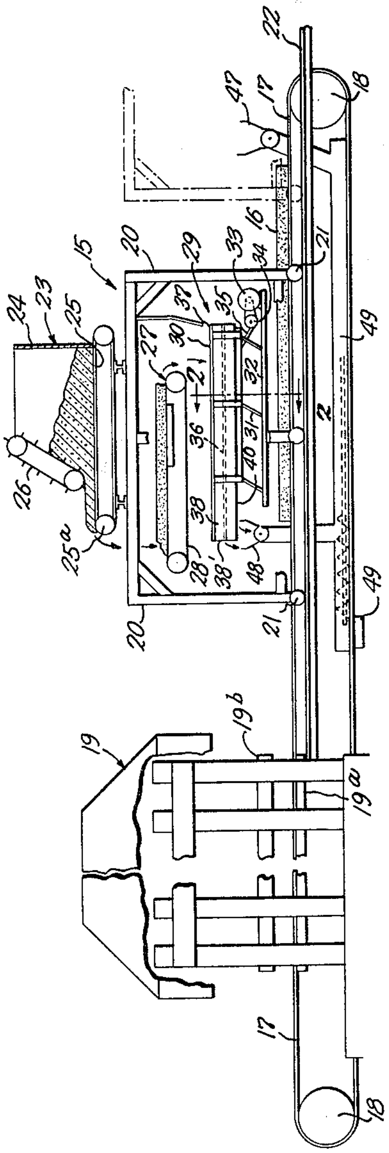
INVENTORS
Edwin A. Jarrett &
Martin Bultman
BY Mason, Fenwick & Lawrence
ATTORNEYS

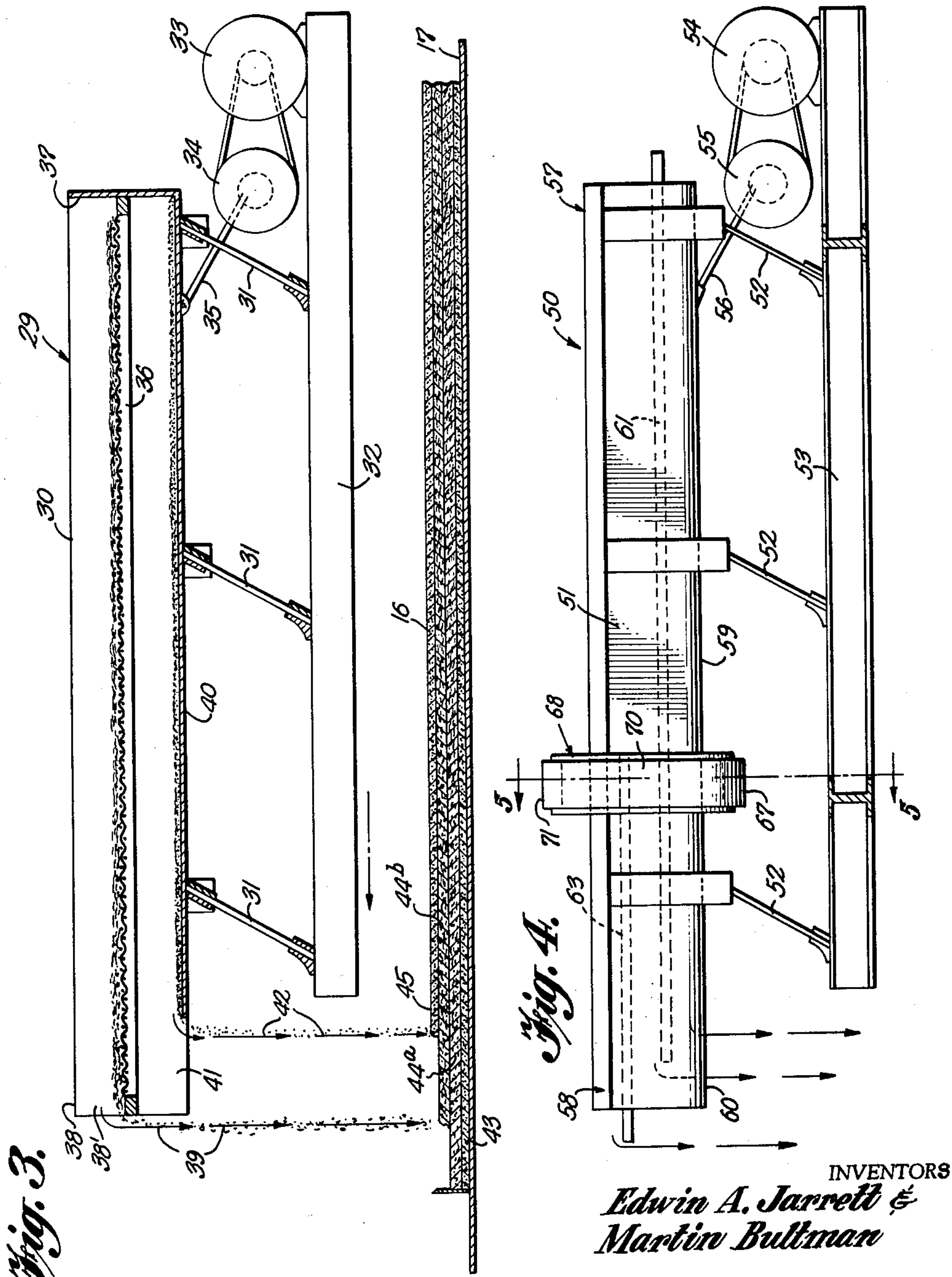
INVENTORS
Edwin A. Jarrett &
Martin Bultman
BY Mason, Fenwick & Lawrence
ATTORNEYS INVENTORS
Edwin A. Jarrett &
Martin Bultman
BY Mason, Fenwick & Lawrence
ATTORNEYS United States Patent Office 3,171,872
Patented Mar. 2, 1965

3,171,872
METHOD AND APPARATUS FOR PRODUCING PARTICLE BOARD AND THE LIKE

Edwin A. Jarrett and Marten Bultman, Richmond, Va., assignors to The Cardwell Machine Company, Richmond, Va., a corporation of Virginia Filed Nov. 24, 1961, Ser. No. 154,720
9 Claims. (Cl. 265—113)

The present invention relates in general to methods and apparatus for classifying, spreading and depositing particulate material in superposed layers of different particle size, and more particularly to methods and apparatus for classifying particulate wood in the form of flakes, chips, splinters, shavings and the like into selected sizes and scattering and distributing the same in a plurality of superposed layers in the production of multi-layer compressed particle board having a core layer of coarser material surfaced by layers of finer material.

Much effort has been devoted in recent years to the production of particle board from wood material in the form of flakes, splinters, shavings, chips, and like particulate material so as to utilize dry wood waste from lumber and other wood-working operations. It has been found that particle board of advantageous properties can be obtained by forming the particle board from mixtures of such raw materials in such a way that a core or central layer of coarser wood particles is covered by a surface layer of finer wood particles so as to provide a smooth surface effect. In general, the process for producing such multi-layer particle board has been to manually refine and classify the wood waste into the desired particle sizes, distribute the wood waste material on belts or metal trays, usually termed cauls, in the desired layered arrangement, convey the mat of materials thus formed to a hydraulic hot press, compress the mat under heat and pressure, and then remove the mat from the press and stack the same to cool. Such particle boards find many uses, particularly in the furniture industry, as corestock for veneered constructions, plastic overlays and the like, and as floor underlays in the building trade for supporting asphalt tile or linoleum, wall panels, and similar uses.

When making particle boards of such particulate wood waste material, it is very important to provide a uniform distribution of the wood particles throughout the area of the mat or panel so that the finished particle board, after it is compressed, will be uniform in density, strength and thickness throughout. Further, to provide particle boards which will have a substantially smooth outer surface of satisfactory finish, the finer fragments of wood must also be distributed uniformly in covering relation to both the upper and lower surfaces of the core layer to provide the smooth outer surfaces of the particle board, and this is preferably done before compression of the mat to form the finished particle board.

In order to produce mats of such superposed layers having a core of coarse wood material and surface layers of fine wood material, others have separated the wood fragments into classified sizes and arranged storage dispensers for the different sizes in succession along a traveling conveyor along with scattering and spreading instrumentalities therefor for each storage dispenser, or have produced a coarse material mat in one distributing machine and processed the coarse material mat through two passes in another dispensing machine to form the fine material surface layer over one side and then over the opposite side of the coarse material mat.

An object of the present invention is the provision of a novel method and apparatus for classifying particulate material into groups of selected particle size and concomitantly scattering and distributing the material on a carrier surface in a manner to produce a multi-layer mat or panel having a core of coarser particles interposed between two surface layers of finer particles.

Another object of the present invention is the provision of a novel method and apparatus for producing multi-layered particle board from wood fragments wherein the particle boards have a core of coarser particles disposed between surface layers of finer particles, characterized by simplification of apparatus, reduction of installation costs and increased rate of production.

Another object of the present invention is the provision of a novel method and apparatus for spreading, distributing and depositing multiple layers of wood fragments on an appropriate receiving surface preparatory to compressing the same into multilayer particle boards, which insures spreading of a uniform deposit of material on the receiving surface and effects substantially simultaneous discharge of wood fragments in separated groups of different size ranges along independent discharge paths spanning the width of the receiving surface and spaced along the direction of relative travel of the receiving surface to concurrently form a plurality of layers of different particle sizes on the receiving surfaces.

Other objects, advantages and capabilities of the present invention will become apparent from the following detailed description taken in conjunction with the accompanying drawings, illustrating two exemplary embodiments of the invention.

In the drawings:

FIGURE 1 is a side elevation of a multi-layer mat-forming apparatus constructed in accordance with one embodiment of the present invention wherein other components of a particle board producing system are illustrated diagrammatically;

FIGURE 2 is a vertical transverse section view of the mat-forming apparatus taken along the line 2—2 of FIGURE 1;

FIGURE 3 is a vertical longitudinal sectional view taken along the line 3—3 of FIGURE 2;

FIGURE 4 is a side elevation view of a modified form of multi-layer mat-forming apparatus constructed in accordance with the present invention;

Figures 5, 6:
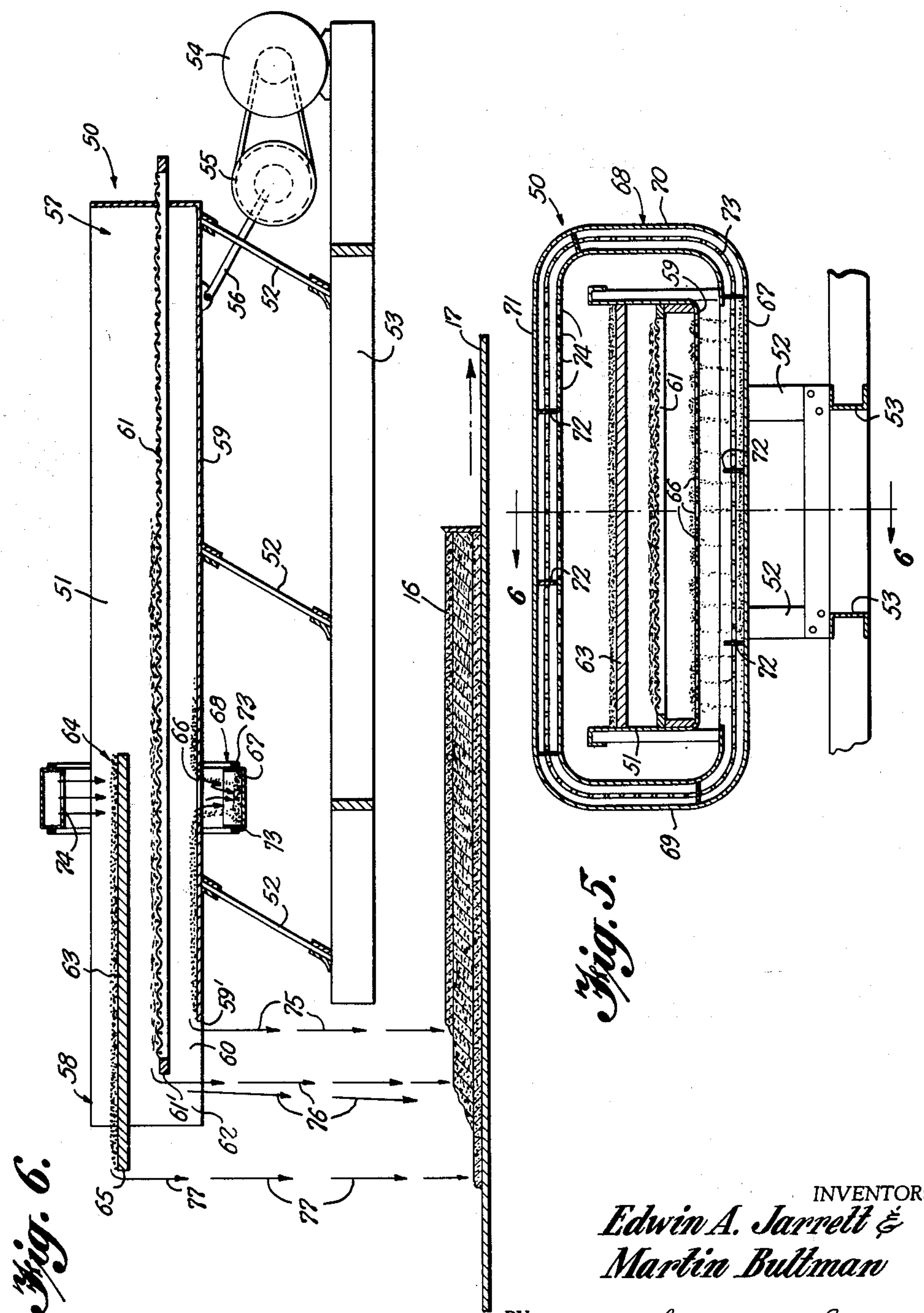
FIGURE 5 is a vertical transverse section view taken along the line 5—5 of FIGURE 4.
FIGURE 6 is a fragmentary vertical longitudinal section view taken along the line 6—6 of FIGURE 5.

Referring now to FIGURES 1, 2 and 3 of the drawings illustrating one preferred embodiment of the invention, and particularly FIGURE 1, the principal components of a particle board producing system are illustrated in a somewhat diagrammatic fashion in association with one form of mat-forming apparatus embodying the present invention. In a typical installation, suitable storage means will be provided near the mat-forming station for storing wood fragments or particles of acceptable size which have been suitably classified to obtain the desired range of particles size and dried, if necessary, to reduce the moisture content to a desired range. One convenient form of such a particle storage facility is an overhead, classified particle storage bin, indicated by the reference character 10. The classified particles stored in the bin 10 may be obtained from any one or more of several well recognized types of raw materials. For example, if the particle board to be produced is of the type generally designated as flake board, de-barked logs will have been flaked by a conventional flaking machine to produce flake thickness according to necessary adjustments and knife settings. The flakes and incidental fines thus produced are fed to a drier to reduce the moisture content to a desired amount, usually 5% to 7%. The dried flakes are then conveyed to classifying screens to remove fine particles smaller than a regulated fineness, and the classified or acceptable flakes are stored in the storage bin 10. If a particle board of the type generally designated as a splinter board is to be produced, the raw material is usually dry block waste, veneer scrap, and like waste products produced in a furniture factory. If this waste material has been preground, it is conveyed to classifying screens where the fines are removed for proper disposal, the oversize particles are removed for regrinding and rescreening, and the acceptable particles are stored in the storage bin 10. If such wood waste had not been preground, and is still in a solid or block form, it is processed through a hammer mill hog and then classified as described above. If such raw material is green or wet, it will also be dried prior to storage. If the particle boards to be produced are of the type generally termed shavings, boards, which are formed from planar shavings or similar shavings, the shavings, if clean, are dried, if green, ground if necessary, screened and then placed in storage.

The acceptable particles storage bin 10 illustrated diagrammatically in FIGURE 1 is provided with screw conveyor discharge means, indicated by the reference character 11, at the bottom of the bin, for regulating discharge of the wood particles from the bin 10, although it will be appreciated that other conventional means for regulating discharge of particles from the bin may be used. The wood particles discharged from the bin 10 are then processed to blend the particles with an adhesive and such additives as may be desired in the proper ratio. Many types of adhesive and additives are available and commonly used. One inexpensive example of a suitable adhesive is a liquid urea-formaldehyde, although phenolic resin, dry powdered adhesive resins and similar adhesives are commonly used. The general range of adhesive usage is from 5% to 9% with an average of 7% resin or glue solids per 100 pounds of wood particles, depending upon the particle geometry, the method of blending adhesive with the particles and the end product desired. The usual additive, if any is employed, is a liquid type wax for increasing dimensional stability although other additives such as fungicides, fireproofing and preservatives may be used. The blending can be accomplished either in a continuous manner, where a continuous belt scale feeds wood particles to a continuous blender and a continuous adhesive or glue pump feeds the adhesive to the blender in the proper ratio, or the adhesive may be blended with the particles in a batch type system where a preset quantity of waste or acceptable particles are weighed and dumped into the blender and a related amount of adhesive is sprayed or otherwise introduced into the blender where the contents are mixed for a preset time. The batch method has been found to be more accurate and is the method employed in the system of FIGURE 1. A suitable batch scale 12 is disposed to receive the wood particles discharged from the bin 10 and is provided with a gate 12*a* at the lower end thereof which opens when a preselected weight of wood particles is deposited in the batch scale 12 to discharge this quantity of wood particles into a conventional batch blender 13. Similarly, the adhesive, and additives if any, are introduced in appropriate quantity into the batch blender 13 from a suitable storage reservoir 14, and the particles, adhesive and additives are thoroughly blended, as for example by rotation of the agitator 13*a* of the batch blender.

The batch blender 13 also has a discharge gate 13*b* for delivering the contents, when thoroughly mixed, to the mat-forming unit generally designated by the reference character 15, which will be described in greater detail hereinafter. The mat-forming unit 15 is operative to deposit a loose mat of blended or adhesive treated particles, generally designated by the reference character 16, onto a suitable mat-receiving surface. In the system herein illustrated, the loose mat 16 is formed on the upper flight of an endless belt 17 supported on suitable rollers 18, at least one of which will be driven, as by a suitable electric motor or the like, the upper flight of the endless belt extending through a single opening hydraulic hot press 19 having for example a stationary platen diagrammatically indicated at 19*a* over which the upper flight of the endless belt 17 rides and a movable press platen 19*b* which is heated with steam, oil, electrical current, or other suitable heat energy and is hydraulically actuated to apply high pressure to the mat 16 on the endless belt 17. By way of example, the temperature of the movable press platen 19*b* may range from 290° F. to 400° F. depending on the particular temperature required for conditions of the type of resin, moisture content, desired time of press cycle, and similar factors encountered, and the unit pressure applied to the mat may be of the order of 300 to 350 p.s.i., although the range may be from 300 to 500 p.s.i. or greater, depending on the press design, the density of the board desired, and like factors. After passage through the hydraulic hot press 19, the mats are then transferred to suitable supporting devices for cooling and storage.

It will be appreciated that a multiple opening hot press may be used, in which event the loose mat would be formed on metal trays or cauls, after which the trays and mats are inserted into the hot press openings and heat and pressure is applied to the trays and mats to compress the mats to the desired thickness for a predetermined time or cycle. Also, if desired, such metal trays or cauls moving on any suitable conveyor may be employed instead of the endless belt 17 with the single opening press.

Assuming that good glue coverage of the particles is achieved, the uniformity of density of particle distribution on the surface of the belt 17 at the mat-forming station, and thus the uniformity of board quality, is largely determined by the mat-forming unit 15. In this embodiment, a smooth surface on the particle board is obtained by laying a three-layer mat having a bottom surface layer of fines, an intermediate or core layer of coarse material, and an upper layer of fines in one operation. The mat-forming unit 15 is mounted on a motorized traveling frame 20 having rollers 21 movable on tracks 22 flanking the endless belt 17 and extending longitudinally of the belt for traverse of the mat-forming unit over the upper flight of endless belt 17, or the caul, if used, while the belt or caul is held stationary, to lay a uniform density mat for the desired panel size. The mat-forming unit 15 of this illustrated embodiment includes a surge bin 23 supported on the traveling frame 20 in the upper region of the frame having a hopper portion 24 for receiving the treated wood particles from the batch blender 13, an endless feed belt 25 forming the bottom of the hopper portion 24 and an endless metering belt 26 for regulating the quantity of treated wood particles allowed to be carried by the feed belt 25 from the hopper portion 24. The feed belt 25 deposits the metered quantity of treated wood particles, as the feed belt 25 passes downwardly over one of the rollers 25*a* therefor, onto a continuous belt scale 27 having a belt 28 of full mat width. The continuous belt scale is of conventional well-known construction, wherein one or both of the rollers for the belt 28 are suspended from the traveling frame 20 so as to produce sensible signals of variations in the weight of material on the belt 28, which signals are coupled to a conventional variable speed drive (not shown) for the metering belt 26 and/or said belt 25 of the surge bin 23 to regulate the feed rate of the treated wood particles delivered by the surge bin 23.

The treated wood particles on the belt 28 of the continuous belt scale 27 are then deposited onto a vibrating conveyor unit 29 of special construction adjacent one end of the vibratory conveyor unit. This vibratory conveyor unit 29 consists essentially of an open trough 30 mounted on springs 31 inclined at a suitable angle, for example 30°, from the vertical, and extending upwardly from a rigid base 32 fixed to the traveling frame 20, on which is supported the usual driving motor 33, belt and pulley system 34 and rocker arm 35 driven eccentrically at one end by the driving motor 33 and connected at its other end to the trough 30. The trough 30 is provided intermediate its height with a wire mesh screen deck 36 sized so as to separate the fines from the coarse particles. With this arrangement, the finer particles in the mass of treated wood particles deposited on the vibratory conveyor unit 29 from the belt scale 27 will pass through the wire mesh screen deck 36 and rest on the bottom of the trough 30, while the coarser particles will continue to be supported on the wire mesh screen deck 36. It will be appreciated that the wire mesh screen deck 36 is removably supported in the trough so that decks of different mesh sizes may be substituted, or more than one screen deck may be provided in the trough to obtain the desired particle separation. The vibratory conveyor unit 29 operates in the usual fashion to convey the particles deposited at the feed end 37 of the trough to the open discharge end 38 of the trough 30, the trough being caused to move upward by the inclined springs on the forward stroke of the trough, carrying the materials in the trough with it, and the trough being caused to move backward and downward on the return stroke faster than gravity drops the material to produce a net progression of the particles toward the discharge end 38. This arrangement also achieves a uniform dispersion of the particles across the board width.

The discharge end of the screen deck 36 terminates in a rectilinear transverse edge which is substantially flush with the discharge end 38 of the trough 30 so that the coarse particles on the screen deck 36 will be discharged through the opening 38′ above the deck 36 at the discharge end 38 of the trough along the path indicated by arrows 39 while the bottom 40 of the trough 30 is relieved adjacent the discharge end 38 to provide an opening 41 for discharge of the fines which pass through the screen deck 36 along the discharge path indicated by arrows 42. The openings 38′ and 41 are offset from each other longitudinally of the direction of travel of the endless belt 17 to space the discharge path 42 for the fines to the right, as viewed in FIGURE 1, of the discharge path 39 for the coarse particles supported on the screen deck 36.

The traveling mat-forming unit 15 in the laying of the loose mat 16 on the upper flight of the endless belt 17 is shifted through an advance stroke from a normal or initial position indicated in solid lines in FIGURE 1 to the dotted line position, during which the discharge path 42 of the fines is in leading relation to the discharge path 39 for the coarse particles. Thus, the fines will form a layer, indicated at 43 on the surface of the upper flight of the endless belt 17 over which will be laid a layer indicated at 44*a* of the coarse particles discharged through the opening 38′ from the discharge end of the screen deck 36. During the return stroke of the traveling frame 20, the discharge path 39 for the coarse particles is in leading relation to the discharge path 42 for the fines, so that a second layer 44*b* of coarse particles is laid over the layer 44*a* of coarse particles which in turn is covered by an upper layer 45 of fines. The two layers 44*a*, 44*b* of coarse particles formed during the advance and return strokes of the traveling frame 20, therefore, form a single intermediate or core layer 44 of coarse particles between the two surface layers 43 and 45 of fine particles.

The traveling mat former 15 when in action has two override positions at each end of the traverse, creating a doubling of mat thickness at these points. To eliminate such an effect on the mat, the traverse of the traveling frame 20 goes beyond the mat length, and when reversing direction, the material flow in these two areas falls into two receivers 47, 48 with which a recirculation conveyor system indicated at 49 is associated for returning the spillage to the surge bin 23 for re-use.

It will be apparent from the foregoing description that the acceptable wood particles stored in the overhead storage bin 10 will be discharged periodically at a metered rate by the screw conveyor discharge means 11 into the batch scale 12, until a selected quantity of acceptable particles has been deposited in the bath scale 12, whereupon the discharge gate 12*a* will be opened to discharge the measured quantity of wood particles into the batch blender 13. The adhesive and additives, if any, are then introduced in appropriate quantity into the batch blender 13 and the batch roller 13*a* is activated to thoroughly blend the contents. The discharge gate 13*b* of the batch blender 13 is then opened at a time when the mat-forming unit 15 is disposed at its rest, or solid-line position, as illustrated in FIGURE 1, at which the surge bin 23 is disposed below the discharge gate 13*b* of the batch blender 13 to receive the material discharged by the batch blender. The blended particles and adhesive in the hopper portion 24 of the surge bin 23 are discharged from the surge bin 23 at a metered rate by means of the endless feed belt 25 and metering belt 26 and deposited onto the belt scale 27, which in turn transports the wood particles to the feed end 37 of the trough 30 of the vibratory conveyor unit 29. Particles deposited on the screen deck 36 of the vibratory conveyor unit 29 are conveyed to the left as viewed in FIGURE 1 toward the discharge end 38 of the trough 30, by the motion imparted to the trough 30 as a result of the movement of the eccentrically driven rocker arm 35 and the action of the springs 31, the finer size wood particles being separated from the coarser particles during progression of the material toward the discharge end 38 of the trough 30 by passage through the screen deck 36. Thus by time the particles reach the region of the discharge end 38 of the trough 30, the fines will have passed through the screen deck 36 into the lower portion of the trough 30 while the coarser particles will be retained on the screen deck 36. The finer size particles or fines in the lower zone of the vibratory conveyor trough 30, supported on the bottom 40 of the trough, will be discharged through the opening 41 along the discharge path indicated at 42, which extend generally along a vertical plane transversley spanning the belt 17 over a width corresponding to the width of the mat 16 to be formed, while the coarse particles are discharged through the opening 38′ defined by the portion of the open discharge end 38 of the trough 30 above the screen deck 36 along the discharge path 39 which extends in a substantially vertical plane transversing the mat width and spaced longitudinally of the direction of travel of the belt 17 from the discharge path 42.

Upon reciprocation of the traveling frame 20 along the rails 22 through its advance stroke from the rest or solid-line position to its projected or broken-line position illustrated in FIGURE 1, the discharge path 42 for the fines is in leading relation to the discharge path 39 for the coarse particles, so that a layer of finer size particles will be laid down on the upwardly facing surface of the upper flight of endless belt 17 slightly in advance of deposit of the coarse particles thereon discharged along the path 39, whereby a layer of fine particles will be formed in the lower surface zone of the mat, as indicated at 43, below the partial layer 44*a* of coarse particles. At the extreme end of the advance stroke, the discharge openings 38′ and 41 of the vibratory conveyor trough 30 pass beyond the end of the mat to be formed on the belt 17 and overlie the receiver 47 so that the particles discharged therefrom will be recirculated to the surge bin 23 and avoid creation of a double mat thickness on the belt 17 in this region. During the return stroke of the traveling frame 20, the discharge opening 38′ is disposed in leading relation to the discharge opening 41 so that the coarse particles distributed along the discharge path 39 are laid on the partial layer 44*a* of coarse particles to form another particle layer 44*b* of coarse particles in advance of deposit of the finer particles along the path 41, so that an upper layer 45 of fine particles is formed in the upper surface zone of the loose mat 16. After reciprocation of the mat-forming unit 15 through its advance and return strokes, the drive for the belt 17 is activated to convey the loose mat 16 into the hydraulic hot press 19 for final compression and cure.

It will be apparent that cauls may be provided on suitable conveyor rolls or a conveyor belt to receive the particles discharged from the vibratory conveyor 29 instead of depositing the particles directly on conveyor belt 17, which expedient will be employed particularly if a multi-opening hydraulic hot press is employed instead of the single opening hydraulic hot press 19 described in the foregoing example. Further, conventional instrumentalities for effecting a pre-compression of the loose mat, trimming of the mat edges, and mat weighing scales may be interposed, if desired, between the mat-forming station and the hydraulic hot press.

In the endless belt, single-opening press system, the cured panel or particle board may be conveyed from the hot press onto a lift table or similar device to be either dead stacked or strip stacked depending upon individual desires.

FIGURES 4, 5 and 6 illustrate a modified vibratory conveyor unit construction, designated by the reference character 50, which may be employed instead of the vibratory conveyor unit 29 of the first-described embodiment to form the loose mat 16 on the endless belt 17. If desired, this modified vibratory conveyor unit construction 50 may be supported at a fixed location above the upper flight of the endless conveyor belt 17 to form the mat during movement of the conveyor belt 17 below the vibratory conveyor unit 50, thereby eliminating the need of the traveling frame 20 and supporting rails 22, or the vibratory conveyor unit 50 may be mounted in a supporting frame in a similar manner to the mounting of the vibratory conveyor 30 in the traveling frame 20 for reciprocation over the conveyor belt 17 while the conveyor belt 17 is held stationary. The modified vibratory conveyor unit 50 has a similar basic construction to the vibratory conveyor unit 30 in that it contains the usual upwardly opening trough 51 mounted on springs 52 which are inclined at a suitable angle, for example 30°, from the vertical and extend upwardly from a rigid base 53 fixed to the desired support. The usual driving motor 54, belt and pulley system 55, and eccentrically driven rocker arm 56 provide the reciprocative drive for the trough 51 to effect progressive transfer of particles fed to the conveyor trough 51 at the feed end 57 toward the open discharge end 58 of the trough. The trough 51 has a bottom 59 extending from the feed end 57 of the trough toward the discharge end 58 over the major portion of the length of the trough but terminating short of the discharge end 58 to provide a discharge opening 60 spanning the width of the trough and located adjacent the discharge end 58. A wire mesh screen deck 61 sized so as to pass the fine particles from the coarse particles discharged onto the screen deck 61 adjacent the feed end 57 of the trough is spaced vertically above the bottom 59 within the trough 51 and also terminates somewhat short of the discharge end 58 but is spaced closer to the discharge end 58 than the end 59′ of the bottom 59 to leave a second discharge opening 62 above the portion of the discharge opening 60 nearest the discharge end 58 for discharge of the coarser particles retained on the screen deck 61.

A horizontal panel or partition 63 is also located within the trough 51 above the screen deck 61 along a selected portion, for example approximately one-third, of the length of the trough adjacent its discharge end 58. This upper panel 63 has a feed zone 64 adjacent the end thereof remote from the discharge end 58 of the trough 51 and a discharge end 65 defined by a rectilinear transverse edge which may be either flush with the discharge end 58 of the trough 51 or may project therebeyond.

The bottom 59 of the trough 51 is provided with a transversely aligned series of openings 66 spaced across the width of the trough 51 and located below the feed zone 64 of the panel 63 for discharging a selected fraction of the fine wood particles which have passed through the wire screen deck 61 and are conveyed along the bottom 59 of the trough into an upwardly opening lower receiving leg 67 of a lifter conveyor unit 68. The openings 66 in the bottom 59 of the trough are preferably adjustable in size to permit selection of different desired fractions of the fine wood particles to be deposited in the lower leg 67 of the lifter conveyor unit 68, as for example by providing louvered openings or a grid gate having plate or web portions associated with each of the openings 66 which may be adjustably positioned transversely to vary the effective size of the opening 66. The lifter conveyor unit 68 is of conventional construction, and may for example, take the form of a closed loop duct comprising lower leg 67, side legs 69 and 70, and an upper leg 71 in which vanes 72 conforming substantially to the cross section of the duct and connected by endless chains 73 or the like, are disposed at spaced intervals throughout the conveyor unit and are driven in a selected direction therethrough. The lower wall of the upper leg 71 of the lifter conveyor unit 68 is provided with a series of openings 74 through which the fine wood particles discharged through the openings 66 in the bottom 59 of the trough 51 into the lower conveyor unit leg 67 and elevated through the conveyor leg 69 to the upper conveyor leg 71, are discharged onto the panel 63 in the feed zone 64 thereof. The openings 74 in the upper lifter conveyor leg 71 are relatively sized to obtain a uniform distribution of the fine wood particles over the width of the panel 63, which may be accompanied, for example, by making the openings 74 of uniform width and of uniformly increasing length progressing from the input end to the output end of the leg 71.

With this construction, it will be apparent that the wood particles deposited on the screen deck 61 of the vibratory conveyor unit 50 at the feed end 57 thereof will be conveyed in the usual fashion toward the discharge end 58, during which the fines will pass through the screen deck 61 and be conveyed along the bottom 59 of the trough. As the fines which have sifted onto the bottom 59 reach the zone of the openings 66, a selected fraction of these fines as determined by the adjustment of the openings 66 will be discharged into the upwardly opening lower leg 67 of the lifter conveyor unit 68 and the remaining fraction of the fines on the bottom 59 of the conveyor will be conveyed onward to the discharge edge 59′ of the bottom 59 and discharged along the path indicated by the arrows 75 through the discharge opening 60 to the conveyor belt 17. The coarser particles retained on the screen deck 61 will be conveyed to the discharge edge 61′ thereof and discharged through the openings 62 and 60 along the path indicated by the arrows 76 to the conveyor belt 17. That fraction of the fines deposited in the lower leg 67 of the lifter conveyor unit 68 will be elevated by the conveyor vanes 72 to the upper conveyor leg 71 and discharged through the openings 74 onto the upper panel 63 in the trough 51 whereupon these fines will be conveyed to the discharge edge 65 of the panel 63 and discharged along the path indicated by the arrows 77 onto the endless belt 17. Because of the relative location of the discharge edge 59′ of the bottom 59, the discharge edge 61′ of screen deck 61 and the discharge edge 65 of panel 63, the fines discharged along the discharge path 75 will form a lower layer of fines on the belt 17, when relative movement along the selected feed path of the belt 17 occurs with relation to the position of the conveyor unit 50, the coarser particles discharged along the path 76 will be deposited on top of the layer of fine particles discharged in slightly advanced relation along the discharge path 75, and the fines elevated to the upper panel 63 and discharged along the discharge path 77 will form an upper layer of fines above the layer of coarse particles deposited on the belt 17, thereby concomitantly producing a loose mat having upper and lower surface layers of fine wood particles and an intervening core layer of coarser wood particles. By adjustment of the space between the discharge edges of the bottom 59, screen deck 61 and upper panel 63 longitudinally of the vibratory conveyor trough 51 and the speed of travel of the belt 17 relative to the vibratory conveyor or the vibratory conveyor relative to the belt 17, the thickness of the layers of fine, coarse and fine wood particles can be adjusted to the desired values. This modified vibratory conveyor construction, therefore, achieves formation of the lower and upper surface layers of fines and intervening layer of coarse particles in one stroke or pass in a single direction relative to the endless conveyor 17 rather than requiring both an advance and a return cycle stroke as in the first-described embodiment. Such an arrangement, therefore, represents a simplification of the system in that the vibratory conveyor unit can be disposed at a fixed station along the path of travel of the conveyor belt 17 and does not need to be supported on a traveling frame for reciprocation through advance and return strokes while the conveyor belt is held stationary.

It will be apparent that a greater number of wire mesh screen decks than those described and illustrated in connection with the foregoing embodiments may be employed wherein different meshes or sizes of screens are used to provide further graduation of the particle sizes and achieve formation of loose mats wherein several layers of progressively larger size particles progress inwardly to the center from the upper and lower surfaces of the mat.

While several preferred examples of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. In a process for manufacturing a composite particle board of particulate material having opposite surface layers of relatively finer size particles and an intervening core layer of coarser size particles and wherein layers of particles arranged on a particle receiving surface are subjected to pressing and heat to form the particle board, the steps of separating particulate material into at least two vertically separated groups of two different selected size ranges, conveying the two groups of particles in separate groups to a discharge state, and moving the separated groups of particles in unison with respect to an elongated particle receiving surface through an advance stroke in a first direction lengthwise of the surface over a distance corresponding to the length of the desired particle board and then through a return stroke of similar length in the opposite direction while distributing the particles of one of said groups onto the relatively moving particle receiving surface along a discharge path spanning the width of the particle receiving surface and concomitantly distributing the particles of the other of said groups in spaced relation lengthwise of the surface to the discharge path of said first group, the coarser size discharge path being spaced in trailing relation to the finer size discharge path during said advance stroke and in leading relation to the finer size discharge path during said return stroke to lay the particles in an order forming an intervening core layer of coarser particles disposed between a pair of layers of finer particles.

2. In a process for manufacturing a composite particle board of wood fragments of shavings, splinters, chips or the like wherein the finished board has upper and lower surface layers of relatively finer size wood particles and an intervening core layer of coarser size wood particles and wherein layers of particles arranged on a particle receiving surface are subjected to pressing and heat to form the particle board, the steps of separating wood fragments into at least two vertically separated fragment groups of two different selected size ranges, and concurrently conveying the two groups of fragments along substantially parallel, vertically spaced paths to a discharge station, and distributing the fragments of said groups onto an elongated relatively moving particle receiving surface along two spaced gravitational discharge flow paths transversely spanning the width of the particle receiving surface and separated along the direction of relative movement of said surface a selected distance related to the speed of relative travel while producing relative movement of the flow paths with respect to the particle receiving surface along an advance stroke of the length of the desired particle board in a first direction lengthwise of the surface and then along a return stroke of similar length in the opposite direction, the discharge flow path of the group of finer size wood fragments being disposed in leading relation to the other flow path during the advance stroke to deposit a layer of coarser size fragments onto a layer of finer size fragments of selected depth and the finer size flow path being in trailing relation to the other flow path during the return stroke to deposit a layer of finer size fragments on a layer of coarser size fragments.

3. Apparatus for classifying, spreading and depositing particulate material on an elongated material receiving surface in a loose mat having upper and lower layers of relatively finer particle size and an intervening core of coarser particle size for presentation to heated press means to form a particle board, the apparatus comprising an open elongated trough having a bottom and longitudinally spaced feed and discharge zones, a perforate classifier deck within said trough spaced upwardly from the bottom thereof and extending longitudinally of the trough between said feed and discharge zones, said classifier deck having openings therein sized to pass particles of a selected smaller size range therethrough to said bottom and to return thereon coarser size particles, means for causing relative movement between said trough and said material receiving surface through an advance stroke and a return stroke in opposite directions longitudinally of the material receiving surface, each stroke having a length substantially equal to the desired length of the mat to be formed means defining discharge openings at said discharge zone for said classifier deck and bottom for gravitational discharge of the particles from said deck and bottom respectively in thin sheet-like flow paths transversely spanning the receiving surface and including transverse rectilinear leading edges relative to the longitudinal axis of the receiving surface spaced along such direction of travel to dispose the discharge flow path of particles from said bottom in leading and trailing relation respectively to the discharge flow path of particles from said classifier deck during said advance stroke and said return stroke, and means for imparting vibratory motion to said trough and said deck to convey particles deposited on said deck at said feed zone to said discharge zone and concurrently separate the same through said deck and distribute the particles transversely of the trough.

4. Apparatus for classifying, spreading and depositing particulate material on an elongated material receiving surface in a loose mat having upper and lower layers of relatively finer particle size and an intervening core of coarser particle size for presentation to heated press means to form a particle board, the apparatus comprising a vibratory conveyor adapted to be mounted in overlying relation to the material receiving surface for relative movement with respect to the receiving surface along the direction of relative travel thereof including an upwardly opening elongated trough having a bottom, upright sides, a feed end and a discharge end, means for transmitting vibratory motion to said trough to cause particulate material delivered to the feed end thereof to be moved to the discharge end thereof, a classifying screen deck mounted in said trough for movement therewith at a position substantially paralleling said bottom and spaced upwardly therefrom between the sides thereof, said screen deck extending from the feed end of said trough toward the discharge end thereof to receive particulate material delivered to said feed end and convey the same toward said discharge end upon vibration of the trough and having openings therein sized to pass particulate material of a selected smaller size range therethrough to said bottom while retaining on said screen deck particulate material of coarser than said selected size range, a movable frame supporting said vibratory conveyor for reciprocative movement over said receiving surface parallel to said direction of travel, means for moving said frame and vibratory conveyor through an advance stroke having a length equal to the desired length of the mat in a first direction and a return stroke of similar length in the opposite direction and means adjacent the discharge end of said trough defining a first discharge opening adjacent said bottom for discharging the material on said bottom along a sheet-like gravitational flow path onto the relatively moving receiving surface and a second discharge opening adjacent said screen deck for discharging the particulate material on said screen deck along a sheet-like gravitational flow path onto the receiving surface spaced in a direction paralleling the direction of travel from the flow path from said first discharge opening, said second discharge opening flow path being in trailing relation and leading relation respectively relative to the other flow path during said advance stroke and said return stroke to deposit a layer of the coarser size particulate material on top of the layer of particulate material discharged along said first mentioned discharge flow path during said advance stroke and to reverse the order of layers deposited thereby during said return stroke.

5. In apparatus for manufacturing composite particle board of wood chips and the like having upper and lower surface layers of fine chips and an intervening core layer of coarser chips including a press for compressing and heating a similarly layered loose mat of the chips and elongated mat conveyor means including an upwardly facing mat-forming surface for receiving chips in the form of a loose mat thereon and conveying the same to said press, the improvement comprising a vibratory conveyor for receiving chips of a selected range of sizes, classifying the same into groups of selected chip sizes, and depositing the same on said mat-forming surface including an open elongated trough having a bottom and longitudinally spaced feed and discharge zones, a perforate classifier deck within said trough spaced upwardly from the bottom thereof and extending longitudinally of the trough between said feed discharge zones, said classifier deck having openings therein sized to pass chips of a selected smaller size range therethrough to said bottom and to retain thereon coarser size chips, traveling supporting means for said trough disposing the trough in overlying relation to the mat forming surface of said mat conveyor means, means for reciprocating said traveling supporting means through an advance stroke and a return stroke in opposite directions paralleling the direction of travel of the mat conveyor means, each of said strokes having a length substantially equal the desired length of the particle board said trough having transversely elongated outlet openings at said discharge zone for gravitationally depositing to said mat-forming surface the smaller size chips on said bottom and the coarse chips on said deck respectively along separate flow paths traversing said mat-forming surface and spaced a selected distance longitudinally of the trough to deposit the smaller size chips in leading relation to the coarse chips during the advance stroke and in trailing relation during the return stroke, and means for vibrating the trough and deck along upwardly inclined paths to convey the chips fed thereto to said discharge zone and concurrently separate the chips into groups by classification through said deck and transversely distribute the same.

6. In apparatus for manufacturing composite particle board of wood chips and the like having upper and lower surface layers of fine chips and an intervening core layer of coarser chips including a press for compressing and heating a similarly layered loose mat of the chips and elongated mat conveyor means including an upwardly facing mat-forming surface for receiving chips in the form of a loose mat thereon and conveying the same to said press, the improvement comprising a vibratory conveyor for receiving chips of a selected range of sizes, classifying the same into groups of selected chip sizes, and depositing the same on said mat-forming surface including an elongated upwardly opening conveyor trough having a bottom and longitudinally spaced feed and discharge zones adjacent opposite ends thereof, a classifier screen within said trough spaced upwardly from the bottom thereof and extending substantially along the length thereof, said classifier screen having openings sized to pass chips of a selected smaller size therethrough to said bottom and to retain thereon coarser size chips, means for vibrating said trough and classifier screen as a unit in an upwardly inclined direction to concurrently transport chips fed thereto to said discharge zone, distribute the chips transversely of the trough, and separate the chips into vertically separated coarse and fine size groups by passage of the smaller size chips through said screen, means defining separate discharge openings respectively for the coarse chips retained on said screen and the finer chips passed to said bottom to discharge the chips in two longitudinally spaced thin sheet-like flow paths transversely spanning the mat-forming surface, a traveling frame supporting said vibratory conveyor in overlying relation to said conveyor means for reciprocative movement along the direction of travel of said conveyor means, and means for reciprocating said traveling frame and vibratory conveyor through an advance stroke and a return stroke in opposite directions paralleling the direction of travel of said conveyor means, each of said strokes having a length substantially equal the desired length of the particle board the discharge openings for said chips being located so that the discharge flow path for the fine size chips is spaced in advance of the discharge flow path for the coarse chips during the advance stroke of said traveling frame and trails the discharge flow path for the coarse chips during the return stroke to form a layer of fine size chips above and below a layer of coarse size chips during reciprocation of said traveling frame through said advance and return strokes.

7. In apparatus for manufacturing composite particle board of wood chips and the like having upper and lower surface layers of fine chips and an intervening core layer of coarser chips including a press for compressing and heating a similarly layered loose mat of the chips, a mat-forming station spaced from said press, elongated mat conveyor means including an upwardly facing mat-forming surface for receiving chips in the form of a loose mat thereon at said mat-forming station and conveying the same to said press, and stationary storage means for the wood chips disposed above said mat-forming station for discharging wood chips to the latter; the improvement comprising a traveling frame disposed above said mat conveyor means at said mat-forming station, track means laterally flanking said mat conveyor means at said mat-forming station supporting said traveling frame for rectilinear reciprocative movement through an advance stroke and a return stroke in opposite directions paralleling the direction of travel of said mat conveyor means, each of said strokes having a length substantially equal the desired length of the particle board a surge bin carried by said traveling frame for receiving wood chips discharged from said storage means when said traveling frame occupies a selected position and including feed regulator means for discharging chips from said surge bin at a regulated rate, belt scale means carried by said traveling frame below said surge bin for receiving chips from said surge bin and discharging the same at a spaced location, a vibratory conveyor carried by said traveling frame below said belt scale means for receiving chips discharged from said belt scale means, classifying the same into groups of selected chip sizes, and depositing the same on said mat-forming surface including an elongated upwardly opening conveyor trough having a bottom and longitudinally spaced feed and discharge zones adjacent opposite ends thereof, a classifier screen within said trough spaced upwardly from the bottom thereof and extending substantially along the length thereof, said classifier screen having openings sized to pass chips of a selected smaller size therethrough to said bottom and to retain thereon coarser size chips, means for vibrating said trough and classifier screen as a unit in an upwardly inclined direction to concurrently transport chips fed thereto to said discharge zone, distribute the chips transversely of the trough, and separate the chips into vertically separated coarse and fine size groups by passage of the smaller size chips through said screen, means defining separate discharge openings respectively for the coarse chips retained on said screen and the finer chips passed to said bottom to discharge the chips in two longitudinally spaced thin sheet-like flow paths transversely spanning the mat-forming surface, the discharge openings for said chips being located so that the discharge flow path for the fine size chips is spaced in advance of the discharge flow path for the coarse chips during the advance stroke of said traveling frame and trails the discharge flow path for the coarse chips during the return strokes to form a layer of fine size chips above and below a layer of coarse size chips during reciprocation of said traveling frame through said advance and return strokes.

8. Apparatus for classifying, spreading and depositing wood chips and the like on a receiving surface in a loose mat having upper and lower surface layers of fine chips and an intervening core layer of coarse chips for presentation to heated press means to be heated and pressed therein to form a similarly layered composite particle board, comprising an open elongated trough having a bottom and longitudinally spaced feed and discharge ends, a classifier screen within said trough spaced upwardly from the bottom thereof and extending substantially along the length of the trough having openings therein sized to pass chips of a selected smaller size therethrough to said bottom and to retain thereon coarser size chips, an upper platform in said trough spaced above said classifier screen and extending from said discharge end toward the feed end of the trough, means located intermediate said feed and discharge ends for withdrawing a selected fraction of the smaller size chips passed through said classifier screen onto said bottom and elevating the same onto said upper platform, said trough having transversely elongated outlet openings at said discharge end for gravitationally depositing on said mat-forming surface the smaller size chips on said bottom, the coarse chips on said classifier screen, and the smaller size chips on said upper platform respectively along separate flow paths traversing said mat-forming surface and spaced in serial fashion longitudinally of the trough, means for producing relative movement between said mat-forming surface on said mat conveyor means and said trough along a direction of travel of the mat conveyor means, and means for vibrating the trough and classifying screen and platform along upwardly inclined paths to convey the chips fed thereto to said discharge end for discharge through said outlet openings and concurrently separate chips deposited on said classifier screen for classification therethrough.

9. Apparatus for classifying, spreading and depositing wood chips and the like on a receiving surface in a loose mat having upper and lower surface layers of fine chips and an intervening core layer of coarse chips for presentation to heated press means to be heated and pressed therein to form a similarly layered composite particle board, comprising an open elongated trough having a bottom and longitudinally spaced feed and discharge ends, a classifier screen within said trough spaced upwardly from the bottom thereof and extending substantially along the length of the trough having openings therein sized to pass chips of a selected smaller size therethrough to said bottom and to retain thereon coarser size chips, and upper platform in said trough spaced above said classifier screen and extending from said discharge end to an intermediate zone between the feed and discharge ends, said bottom having a withdrawal opening means at said intermediate zone for gravitationally discharging therethrough a selected fraction of the smaller size chips passed through said classifying screen onto said bottom, an elevator conveyor means having a feed leg underlying said withdrawal opening means and a discharge leg transversely spanning and overlying said upper platform at said intermediate zone for conveying chips discharged through said withdrawal opening means upwardly onto said upper platform, said trough having transversely elongated outlet openings at said discharge end for gravitationally depositing on said mat-forming surface the smaller size chips on said bottom, the coarse chips on said classifier screen, and the smaller size chips on said upper platform respectively along separate flow paths traversing said mat-forming surface and spaced in serial fashion longitudinally of the trough, means for producing relative movement between said mat-forming surface on said mat conveyor means and said trough along a direction of travel of the mat conveyor means, and means for vibrating the trough and classifying screen and platform along upwardly inclined paths to convey the chips fed thereto to said discharge end for discharge through said outlet openings and concurrently separate chips deposited on said classifier screen for classification therethrough.

References Cited by the Examiner

UNITED STATES PATENTS

| | | | |
|---|---|---|---|
| 1,862,318 | 6/32 | Ruby | 264—112 XR |
| 2,737,997 | 3/56 | Himmelheber et al. | 264—112 XR |
| 2,783,698 | 3/57 | Bambi | 209—255 XR |
| 2,822,028 | 2/58 | Himmelheber et al. | 264—40 |

FOREIGN PATENTS

| | | |
|---|---|---|
| 583,391 | 9/59 | Canada. |
| 80,593 | 4/95 | Germany. |
| 809,332 | 2/59 | Great Britain. |
| 867,219 | 5/61 | Great Britain. |
| 83,489 | 12/56 | Netherlands. |

ROBERT F. WHITE, *Primary Examiner.*

EARL M. BERGERT, ALEXANDER H. BRODMERKEL, *Examiners.*